United States Patent
Dean et al.

(10) Patent No.: US 6,568,437 B2
(45) Date of Patent: May 27, 2003

(54) INLET FITTING

(75) Inventors: William C. Dean, Valley Park, MO (US); Robert E. Sever, Florissant, MO (US)

(73) Assignee: Essex Industries, Inc., St. Louis, MO (US)

( * ) Notice: Subject to any disclaimer, the term of this patent is extended or adjusted under 35 U.S.C. 154(b) by 0 days.

(21) Appl. No.: 10/074,877

(22) Filed: Feb. 12, 2002

(65) Prior Publication Data

US 2002/0108674 A1 Aug. 15, 2002

Related U.S. Application Data

(60) Provisional application No. 60/268,396, filed on Feb. 13, 2001.

(51) Int. Cl.[7] ................................................ B67C 3/02
(52) U.S. Cl. .................... 141/97; 141/286; 137/505.11; 137/505.42
(58) Field of Search ............................. 141/18, 21, 29, 141/37, 44, 67, 83, 97, 285, 286; 137/505, 505.11, 505.19, 505.23, 505.26, 505.39, 505.41, 505.42

(56) References Cited

U.S. PATENT DOCUMENTS

| | | |
|---|---|---|
| 2,819,728 A | 1/1958 | Gage et al. |
| 3,699,998 A | 10/1972 | Baranowski, Jr. et al. |
| 4,719,940 A | 1/1988 | Beavers |
| 5,234,501 A | 8/1993 | Nakao et al. |
| 6,082,396 A | 7/2000 | Davidson |
| 6,116,242 A | 9/2000 | Frye et al. |
| 6,148,841 A | 11/2000 | Davidson |
| 6,286,543 B1 | 9/2001 | Davidson |

*Primary Examiner*—Timothy L. Maust
(74) *Attorney, Agent, or Firm*—Peter S. Gilster; Greensfelder, Hemker & Gale, P.C.

(57) ABSTRACT

Safety device (20) for a high-pressure fluid regulator for preventing risk of combustion caused by high velocity particles entering the regulator includes an inlet body (24) having a passage in fluid communication to receive the fluid prior to supply to the regulator, to which the device is connected. A filter (60) within the inlet body filters fluid passing through the passage. A fluid disrupter (62) is disposed between the filter and the regulator so that high velocity particles are kept by the filter and disrupter from entering the regulator.

17 Claims, 2 Drawing Sheets

INLET FITTING

CROSS REFERENCE TO RELATED APPLICATIONS

This application is based upon Provisional Patent Application, Serial No. 60/268,396, entitled "Inlet Fitting", filed Feb. 13, 2001, the contents of which are incorporated herein by reference in their entirety and continued preservation of which application is requested.

BACKGROUND OF THE INVENTION

1. Field of the Invention

The present invention relates to core inserts and more particularly to a novel, highly advantageous inlet device which may be utilized in systems to allow for safe handling and storing of pressurized fluids or gases, such as oxygen.

2. Related Art

Regulators are used in pressurized gas storage and delivery systems to convert high pressure gas housed in containers to a lower pressure for delivery. In the medical field, pressurized gas, such as breathing oxygen, flows from a post valve of a container, through a regulator, which delivers lower pressure breathing oxygen to a patient. Over time, the pressurized gas is expended, and the containers must be replaced. There could be risk associated with disconnecting and reconnecting the regulators with the gas containers if particles, such as dirt and dust, become lodged in the gas passage, such as in the post valve of the high pressure gas container. Such particles might present a potential for ignition. Rusting and flaking of the container may also be sources for debris that may become entrained with the high pressure gas. Conventional gas systems, upon coupling with a high pressure gas source, typically provide an uninterrupted flow passage of high pressure gas to the regulator. Additionally, known regulators may merely contain screens in their inlet passages, similar to those in faucets, which are possibly inadequate to stop these particles, as screens are relatively coarse and thin.

The condition most likely to propel these particles occurs when a post valve of a high pressure container connected to an unpressurized (ambient pressure) regulator is initially opened. Gas propelled by the extreme pressure differential between the high pressure container and the unpressurized regulator chamber, carry and accelerate these particles through the regulator inlet passage at subsonic speeds before reaching the regulator chamber. Should these high velocity particles collide with the side walls of the regulator chamber, which is typically constructed of aluminum, ignition could occur, resulting in a potentially disastrous condition. This becomes especially problematic with highly flammable gases and/or gases that support combustion, such as pure oxygen, because materials used to construct these regulator chambers which are not ordinarily susceptible to supporting combustion, become more susceptible to supporting combustion due to the highly oxygenated environment.

Further complicating matters, opening a high pressure container connected to a previously unpressurized regulator subjects the regulator to an immediate and significant rise in both pressure and temperature. Therefore, a gas entering a regulator chamber initially at low pressure becomes heated as additional gas and pressure is applied, which also causes metal regulators to heat up and to further expand, further enhancing the susceptibility of the regulator material to support combustion, especially in a highly oxygenated environment. Thus, the possibility of flames or explosions has caused manufacturers to concern themselves with the use of aluminum in regulators, especially those used in handling pure oxygen.

Regulators can be made from safer materials that are more dense and less prone to combustion. A preferred material is brass, as it is relatively safe when in a pure oxygen environment. Unfortunately, brass is both extremely expensive and immensely heavy. It is thus desirable for a pressure regulating device to possess the safety characteristics of brass, but without its inherent weight and expense.

SUMMARY OF THE INVENTION

Accordingly, among the several objects, features and advantages of the invention may be noted the provision of a safety inlet device for providing additional safety in a high-pressure fluid regulator for preventing risk of combustion caused by high velocity particles entering the regulator, requiring a minimum number of parts, that is easy and quick to install. More specifically, the inlet device of the present invention prevents high velocity particles entrained in a highly pressurized oxygen or similarly combustible gas that enters a regulating device, from colliding with the chamber walls of the regulating device with sufficient energy to cause a spark, thereby preventing an explosion. Further, the inlet device of the present invention prevents any fire or flame originating upstream of the inlet fitting from entering the chamber of the regulating device. Additionally, because the inlet device may be inserted into the inlet passage of the regulator, the regulator may be constructed of lighter, less expensive materials such as aluminum, without the dangers associated with dispensing breathable oxygen or other similarly combustible gases.

Briefly, the safety inlet device of the invention comprises or consists of or consists essentially of an inlet body having a proximal end and a distal end for being fitted to the regulator. The inlet body includes a bore having first and second bore regions extending from the proximal end toward the distal end. A shoulder within the bore is between the first and second bore regions. The bore transitions at the shoulder from the first to the second bore regions. The second bore region is in communication with the regulator to allow flow of fluid from the second bore region into the regulator. A filter is in filtering relationship within the first bore region for filtering of fluid passing through the first bore region toward the second bore region. A baffle device which may have surface irregularities is disposed between the filter and the second bore region. Although either the shoulder surface or the baffle device may contain surface irregularities, at least one should contain surface irregularities so as not to substantially restrict fluid communication. The shoulder surface interacts with the baffle device to provide disruption of force of fluid passing between the first and second bore regions. The shoulder surface cooperates with the baffle device to permit force-disrupted fluid to pass an impingement region between the shoulder surface and the baffle device. Therefore, any high velocity particles entrained in a high pressure fluid stream and directed into the regulator must first pass through the filter. These particles must then pass, in force-disrupted fluid communication with the baffle device, and if not entrapped by the filter, can then impinge against a surface within the impingement region around the baffle device before reaching the distal end of the body. These high velocity particles are thereby prevented from being introduced into the regulator with risk of fire or explosion.

Other objects, advantages and features will be in part apparent and in part set forth below.

BRIEF DESCRIPTION OF DRAWINGS

Corresponding reference characters identify corresponding elements throughout the views of the drawings.

DESCRIPTION OF INVENTIVE EMBODIMENTS

Figure 1:
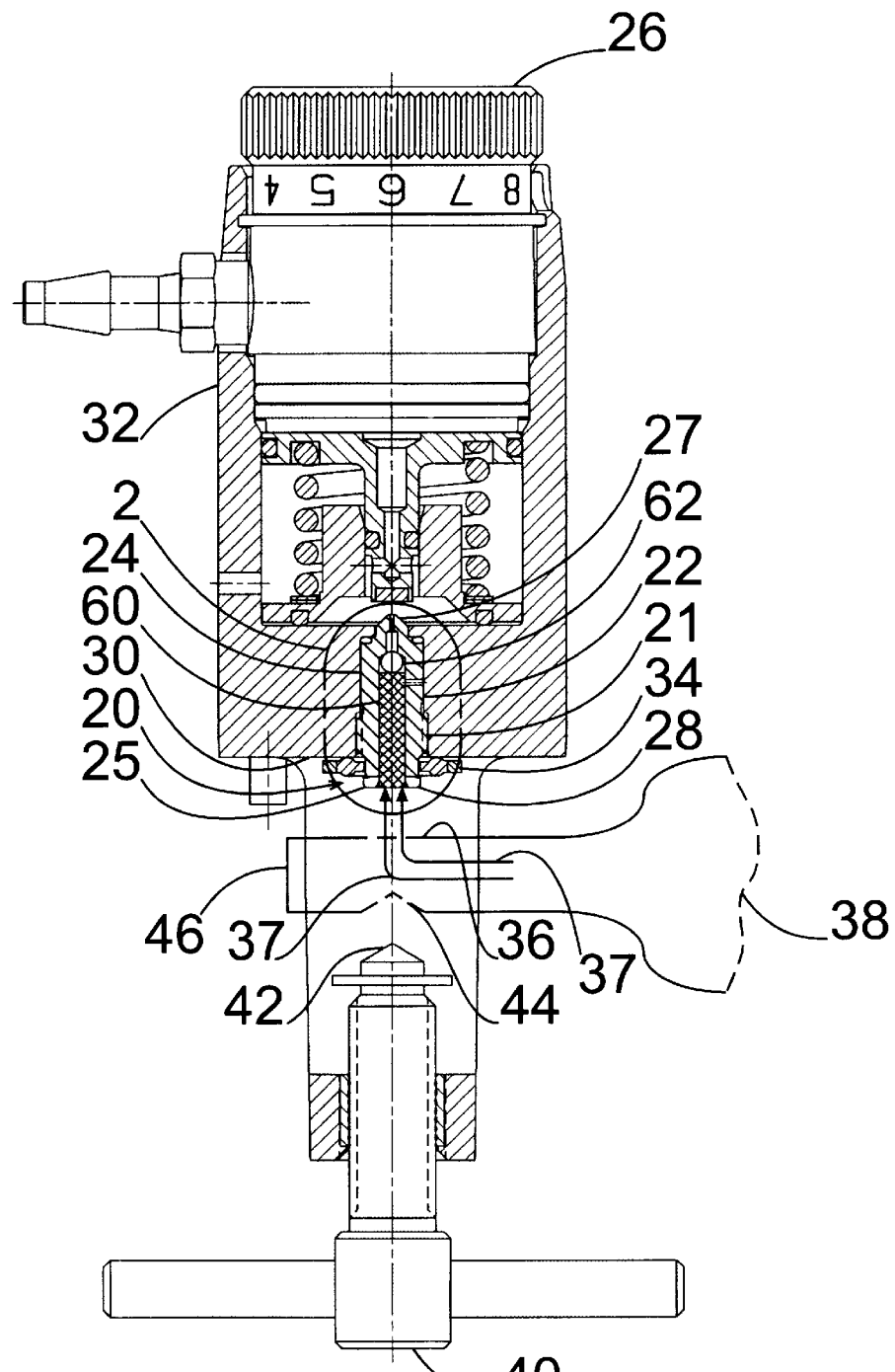
FIG. 1 is a longitudinal cross section of an inlet device of the present invention inserted in an inlet passage of a regulator.

Referring to the drawings, FIG. 1 illustrates inlet device 20 of the present invention preferably threadedly inserted 21 into inlet passage 22, also referred as a first bore, of regulator 26. Inlet body 24 having a proximal end 25 and a distal end 27 preferably has a proximal flange 28 protruding from proximal surface 30 of regulator body 32 to secure first O-ring 34. First O-ring 34 is positioned at the base of flange 28. First O-ring 34 and flange 28 form a seal with regulator inlet-facing surface 36 of post valve 46 of container 38 to prevent leakage of high-pressure gas 37, such as oxygen, between post valve 46 of container 38 and regulator 26. After positioning post valve 46 of container 38 generally as shown in FIG. 1, this seal is produced by rotating T-handle 40 of regulator 26, wherein engagement screw 42 of T-handle 40 engages corresponding indention 44 in post valve 46, and directs regulator inlet-facing surface 36 of post valve 46 into contact with first O-ring 34. First O-ring 34 is compressed between regulator inlet-facing surface 36 of post valve 46 and proximal surface 30 of regulator body 32.

Figure 2:
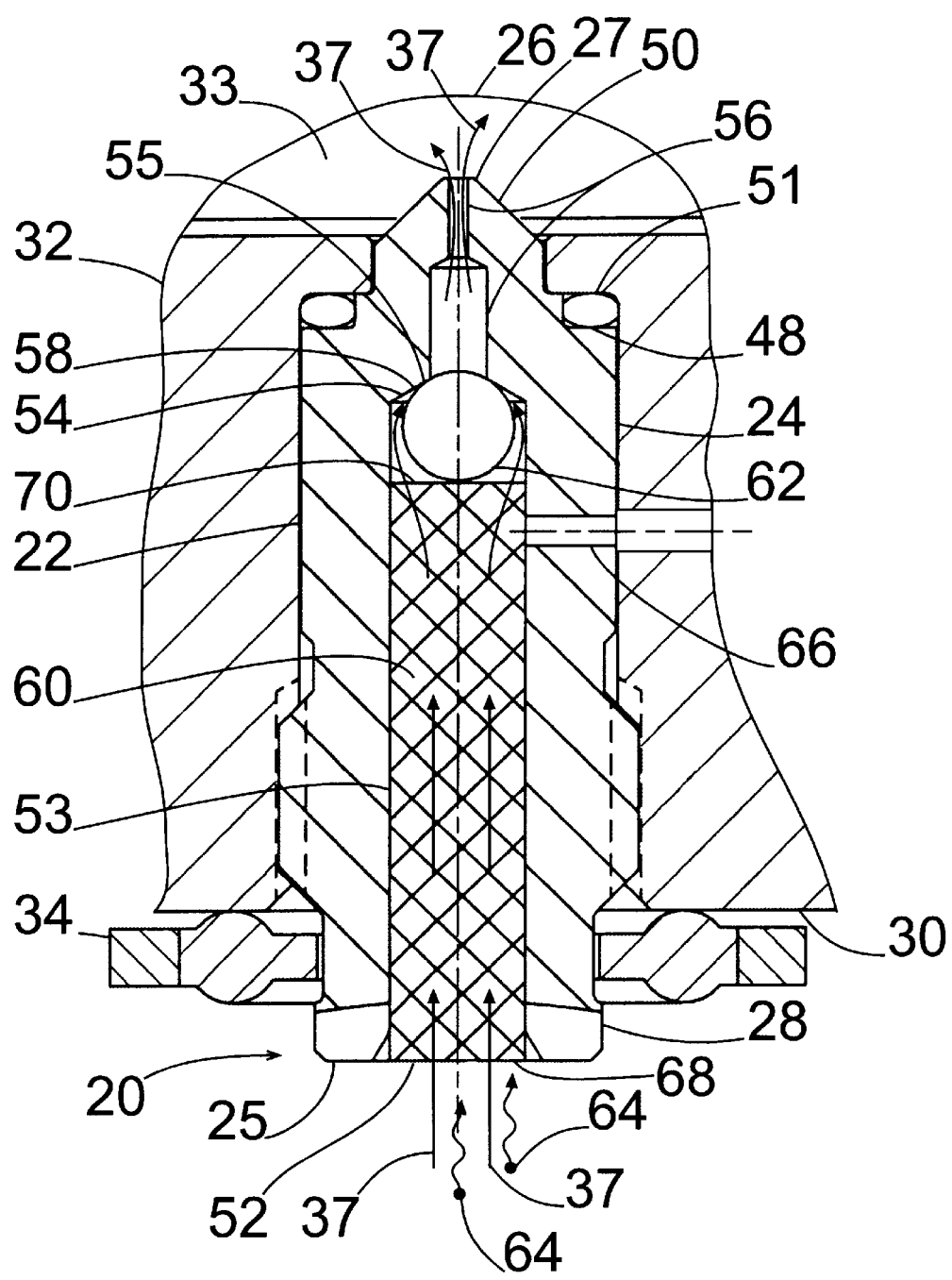
FIG. 2 is an enlarged longitudinal cross section of the inlet device.

Referring to FIG. 2, to establish a seal between inlet device 20 and regulator body 32, proceeding toward distal end 27 from proximal end 25 of inlet body 24, preferably cylindrical shaped inlet body 24 transitions to a radially inwardly extending first shoulder 48, which further transitions into an inlet body tip 50 at distal end 27, which protrudes through regulator body 32, and into regulator chamber 33. A second O-ring 51 is disposed between first shoulder 48 and regulator body 32, and effects a seal upon sufficient compression between first shoulder 48 and regulator body 32.

It can be seen by one skilled in the art that inlet body 24 may be press-fitted into first bore 24 of regulator body 32.

Further referring to FIG. 2, inlet body 24 has a second bore 52, also referred to as a passage, extending longitudinally from proximal end 25 toward distal end 27. Second bore 52 has a first bore region 53 and a second bore region 56. A second shoulder 54, also referred to as a raised region, having a radially inwardly extending surface defining second bore 52, transitions to a second bore region 56, that is, preferably of less cross-section than first bore region 53. The second bore region 56 is in fluid communication with the regulator to allow flow of fluid from the second bore region 56 into the regulator, which extends longitudinally to distal end 27 of inlet body 24. Second shoulder surface 58 has preferably at least one or more irregularities therein, so that gas may pass between surface 58 and baffle device 62.

A filter 60 having a proximal end 68 and a distal end 70, also referred to as a first end and a second end, is inserted in second bore 52 of inlet body 24, preferably so that proximal end 68 is flush with proximal end 25 of inlet body 24 to avoid trapping debris therebetween. Trapped debris may increase both the chances of fire and the amount of damage sustained if a fire occurs. Filter 60 is both preferably cylindrical and comprised of bronze or similar material, which is desirable because of its density and its similar resistance to flame as brass, while remaining malleable. Further acting as a flame arrester when properly sized, filter 60 also prevents flames from entering regulator chamber 33 through inlet passage 22.

Filter 60 may have other possible cross sectional geometries, as long as filter 60 sufficiently conformally fits second bore 52 so as to ensure that all gas input flow is through the filter. Alternately, referring to FIG. 1, it is also apparent that filter 60 need not be confined to or necessarily be located within second bore 52, provided that filter 60 is disposed between post valve 46 and baffle device 62.

Referring to FIG. 2, baffle device 62, also referred as a fluid disrupter, is preferably spherical or ovoidal, and is preferably disposed firmly between distal end 70 of filter 60 and second shoulder surface 58 to prevent baffle device 62 from rattling within second bore 52. A fundamental function of baffle device 62 is to further prevent high velocity particles 64 from traveling through the distal end 27 of second bore 52 and striking the walls of regulator chamber 33. In other words, baffle device 62 interacts with second shoulder surface 58 to provide a disruptive relationship, or disruption of force, of fluid 37 passing between the first and second bore regions 53, 56, or, at least, cause high velocity particles 64 to lose sufficiently their thermal energy to thereby prevent them from being introduced into regulator 26 with risk of fire or explosion. Preferably, baffle device 62 is comprised of brass, due to its considerable mass and superior thermal conductivity, and protects regulator chamber 33 from catastrophic collisions with high velocity particles 64.

Baffle device 62 is seated on second shoulder surface 58 which cooperatively defines an impingement region 55 therebetween to permit fluid to pass along impingement region 55 in force-disrupted fashion. Either baffle device 62 or second shoulder surface 58 preferably contains at least one irregularity. These irregularities include, but are not limited to, notching, checking, knurling, or surface roughening, as well as other regular or irregular surface modifications that are suitable for the purpose intended. Without these irregularities, the seat formed by baffle device 62 in secure contact with second shoulder surface 58 would effectively restrict fluid flow through inlet fitting 20. According to a preferred construction, a staking tool (not shown) of known construction may be used to form second shoulder surface 58 irregularities, preferably by depressing at least one channel therein. This forces high velocity gas 37 to travel in interrupted, or force-disrupted, fluid communication by directing high velocity gas 37 around and between baffle device 62, second shoulder surface 58 and second bore region 56. This interruption causes the desired results preventing high velocity particles 64 from being introduced into the regulator with risk of fire or explosion due to at least the following reasons:

1) by causing high velocity particles 64 to strike either or both second shoulder surface 58 or baffle device 62, that is, cause the high velocity particles 64 to impinge against a surface of the impingement region 55 before reaching the distal end of the inlet body 24,
2) by causing high velocity particles 64 to pass sufficiently close to baffle device 62 such that baffle device 62 absorbs and thereby dissipates the thermal energy associated with high velocity particles 64,
3) by directing high velocity particles 64 significantly out of its otherwise unobstructed (generally straight from the post valve 46, through the regulator inlet passage 22 and into the regulator chamber 33) path as to cause high velocity particles 64 to lose sufficiently their thermal energy, or 4) any combination of reasons 1)-3).

Additionally, if high velocity gas 37 becomes heated, baffle device 62 acts as a heat sink, and dissipates thermal energy from high velocity gas 37 before it reaches regulator chamber 33.

Therefore, high velocity particles 64 entrained in the gas 37 passing from the proximal end 25 to the distal end 27 of the inlet body 24 are acted upon by the filter 60 and the baffle device 62 so that the high velocity particles 64, if any, passing both the filter 60 and baffle device 62 prior to reaching the distal end 27 pose no risk of fire or explosion.

It should be understood that second shoulder surface 58 irregularities may be formed during initial molding of the inlet body 24, or by a staking tool that either introduces at least one channel, or irregularity, into second shoulder surface 58 so that a flow path, albeit an interrupted flow path, is established. Moreover, it is apparent that baffle device 62 may be of any number of geometries, so long as gas flow directed around any particular geometry sufficiently interrupts high velocity particles 64 so that sparks and explosions cannot occur.

Referring to FIG. 2, inlet fitting 20 is easily assembled and installed into regulator 26 generally as described. Second shoulder surface 58 of inlet body 24 is staked with a staking tool, if required, and baffle device 62 is inserted in second bore 52 of inlet body 24, resting on second shoulder surface 58. Filter 60 is inserted in first bore region 53 of second bore 52 until baffle device 62 is secured between filter 60 and second shoulder surface 58. After slipping second O-ring 51 over inlet body tip 50 and positioning second O-ring 51 against first shoulder 48 of inlet body 24, inlet body 24 is inserted in inlet passage 22 of regulator 26. Finally, first O-ring 34 is then slipped over proximal flange 28 and secured at the base of proximal flange 28.

In an improvement to this device, inlet body 24 has a radially extending aperture 66 therethrough which permits a pressure gauge to be connected thereto.

Second bore region 56 is preferably of less cross-section than first bore region 53, but second bore region 56 may instead be of equal or greater cross-section than first region 56.

Although high-pressure gas 37 is preferably oxygen, the safety inlet device of the present invention may also be used with any high-pressure gas that supports combustion.

In addition, raised region 54 which extends inwardly along second bore 52 adjacent baffle device 62 between the baffle device 62 and the distal end 27 defining an impingement region 55 for fluid to pass in force-disrupted fashion, does not necessarily define a shoulder extending continuously around second bore 52. Raised region 54 may be confined to a protrusion into second bore 52 so long as the desired safety results are maintained.

Second bore 52, including first and second bore regions 53, 56, may alternately define a passage that is neither straight, circular nor of constant cross-section, so long as filter 60 and baffle device 62 interact with high velocity particles 64 to produce the desired results.

Therefore, it is seen that the present invention provides a safety inlet device for a high-pressure fluid regulator, for preventing risk of combustion caused by high velocity particles entering the regulator. The safety inlet device includes an inlet body having a proximal end and a distal end for being fitted to the regulator. The inlet body has a bore which extends from the proximal end toward the distal end. The bore has first and second bore regions, the second bore region being of less cross-section than the first bore region. Between the first and second bore regions, a shoulder is formed having a radially inwardly extending surface within the bore. The shoulder surface has irregularities formed therein by a staking tool having at least one channel. The bore transitions at the shoulder from the first to the second bore regions. The second bore region is in fluid communication with the regulator to allow flow of fluid from the second bore region into the regulator. A generally cylindrical filter having a proximal end and a distal end comprised of sintered bronze is maintained in filtering relationship within the first bore region. The filter filters fluid passing through the first bore region toward the second bore region. The filter is inserted in the bore until the proximal end of the filter is flush with the proximal end of the inlet body. A generally spherical baffle device may be comprised of brass and acts as a heat sink. Disposed between the filter and the second bore region, the shoulder surface interacts with the baffle device to provide disruption of force of fluid passing between the first and second bore regions. The shoulder has a shoulder surface which cooperates with the baffle device to permit force-disrupted fluid to pass an impingement region between the shoulder surface and the baffle device. Therefore, any high velocity particles entrained in a high pressure fluid stream directed into the regulator must pass through the filter before passing in force-disrupted fluid communication the baffle device. If these high velocity particles are not entrapped by the filter, they can then impinge against a surface within the impingement region around the baffle device before reaching the distal end of the inlet body. If these high velocity particles do not impinge within the impingement region, they must pass sufficiently close to baffle device such that baffle device absorbs and thereby dissipates the thermal energy associated with high velocity particles. If the high velocity particles do not pass sufficiently close to baffle device, the particles are directed significantly out of their otherwise unobstructed path as to cause the particles to sufficiently lose their thermal energy. Such high velocity particles are thereby prevented from being introduced into the regulator with risk of fire or explosion.

In view of the foregoing description of the present invention and various embodiments and methods it will be seen that the several objects of the invention are achieved and other advantages are attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A safety inlet device for a high-pressure fluid regulator, for preventing risk of combustion caused by high velocity particles entering the regulator, comprising:

an inlet body having a proximal end and a distal end, the distal end for being fitted to the regulator, the inlet body having a bore extending from the proximal end toward the distal end, the bore having first and second bore regions, a shoulder within the bore between the first and second bore regions, the bore transitioning at said shoulder from the first to the second bore regions, the second bore region being in fluid communication with the regulator to allow flow of fluid from the second bore region into the regulator, a filter in filtering relationship within the first bore region, for filtering of fluid passing through the first bore region toward the second bore region, a baffle device disposed between the filter and the second bore region, the shoulder having a surface interacting with the baffle device to provide disruption of force of fluid passing between the first and second bore regions;

the shoulder surface cooperating with the baffle device to permit force-disrupted fluid to pass an impingement region between the shoulder surface and the baffle device, wherein the shoulder surface has irregularities which are formed having at least one channel depressed into the surface, whereby any high velocity particles entrained in a high pressure fluid stream directed into the regulator must pass through the filter before passing in force-disrupted fluid communication around the baffle device, and if not entrapped by the filter, can then impinge against a surface within the impingement region around the baffle device before reaching the distal end of the inlet body, such high velocity particles being thereby prevented from being introduced into the regulator with risk of fire or explosion.

2. A safety inlet device for high-pressure inlet to a gas regulator, for preventing risk of combustion of the gas caused by any high velocity particles entering the regulator, the safety inlet device including an inlet body having a upstream end for high pressure gas inlet and a downstream end for high pressure gas outlet, the downstream end being fitted to the regulator wherein the gas at high pressure is to be regulated within the regulator downstream of the safety inlet device, the inlet body having a bore extending from the upstream end toward the downstream end, the bore having first and second bore regions, a shoulder within the bore between the first and second bore regions, the bore transitioning at said shoulder from the first to the second bore regions, the second bore region being in gas communication with the regulator, a filter within the first bore region for filtering of gas passing through the first bore region toward the second bore region, characterized by:

an energy absorbing device disposed between the filter and the second bore region, the energy absorbing device being metallic, the shoulder having a surface having regular or irregular surface modification interacting with the energy absorbing device to provide disruption of force of gas passing from the first to the second bore regions and to permit force-disrupted gas to pass an impingement region between the shoulder surface and energy absorbing device;

whereby any high velocity particles entrained in a high pressure gas stream directed into the regulator must pass through the filter before passing in force-disrupted gas communication the energy absorbing, and if not entrapped by the filter, can then impinge against said surface within the impingement region before reaching the regulator, and if not so impinging, the high velocity particles must pass sufficiently close to energy absorbing device that said energy absorbing device absorbs and dissipates thermal energy of the high velocity particles so as to cause the high velocity particles to sufficiently lose their thermal energy to prevent them from being introduced into the regulator with risk of fire or explosion.

3. A safety inlet device as set forth in claim 2 further characterized in that the filter is comprised of sintered bronze.

4. A safety inlet device as set forth in claim 2 further characterized in that the energy absorbing device is generally either spherical or ovoid.

5. A safety inlet device as set forth in claim 2 further characterized in that the energy absorbing device is comprised of brass.

6. A safety inlet device as set forth in claim 2 further characterized in that first and second bore regions and the energy absorbing device are each of circular cross-section.

7. A safety inlet device as set forth in claim 2 further characterized by an aperture in the inlet body extending radially from the bore to connect a pressure gauge.

8. A safety inlet device as set forth in claim 2 further characterized in that the body is comprised of brass.

9. A safety inlet device set forth in claim 2 further characterized in that the filter further acts as a flame arrester.

10. A safety inlet device as set forth in claim 2 further characterized in that the shoulder surface modification provides one or more irregularities.

11. A safety inlet device as set forth in claim 10 further characterized in that the surface irregularities are formed by a staking tool.

12. A safety inlet device as set forth in claim 11 further characterized in that the surface irregularities are formed having at least one channel depressed into the surface.

13. A safety inlet device as set forth in claim 2 further characterized in that the gas comprises oxygen.

14. A safety inlet device for a high-pressure gas regulator, for preventing risk of combustion caused by high velocity particles entering the regulator with high pressure gas, including, an inlet body having a upstream end for high pressure gas entry and a downstream end, a passage in gas communication between the upstream and downstream ends, the downstream end permitting the high pressure gas to be delivered to the regulator for gas pressure regulation therein, a filter within the inlet body in gas-filtering and flame-arresting with gas flowing in the passage from the upstream end to the downstream end of the inlet body, and characterized by a metal energy absorbing device disposed between the filter and the downstream end within the passage in energy-disrupting relationship with gas passing the energy absorbing device, the inlet device defining a shoulder surface cooperating with the energy absorbing device to form an impingement region between the shoulder surface and the energy absorbing device to permit force-disrupted gas to pass the impingement region such that any high velocity particles entrained in the gas passing from the upstream to the downstream ends interact with the energy absorbing device prior to reaching the downstream end so as to prevent risk of fire or explosion.

15. A safety inlet device as set forth in claim 14 further characterized in that the high pressure gas comprises oxygen.

16. A safety inlet device as set forth in claim 14 further characterized in that the shoulder surface has irregularities formed therein for gas flow in the impingement region.

17. A safety inlet device for a gas regulator for regulating the pressure of oxygen provided from a high pressure source thereof, an inlet body having a upstream end for receiving high pressure oxygen and a downstream end for delivery of the high pressure oxygen to the regulator, the downstream end being fitted to the regulator, the inlet body having a bore extending from the upstream end toward the downstream end characterized by:

the bore having first and second bore regions, the second bore region being of less cross-section than the first bore region, a shoulder having a radially inwardly extending surface within the bore between the first and second bore regions, the shoulder surface having irregularities, formed by a staking tool, comprising at least one channel, the bore transitioning at said shoulder from the first to the second bore regions, the second bore region being in gas communication with the regulator for flow of high pressure gas into the regulator prior to regulation of pressure of the gas within the regulator, a combined filter having a upstream end and a downstream end comprised of sintered bronze in filtering relationship within the first bore region, the filter filtering of gas passing through the first bore region toward the second bore region and serving also as a flame barrier between the first and second bore regions;

an energy absorbing device comprised of brass and spherical form for acting as a heat sink and disposed between the filter and the second bore region, the shoulder surface interacting with the energy absorbing device to form an impingement region between the shoulder surface and the energy absorbing device, to permit force-disrupted gas to pass the impingement region between the first and second bore regions;

whereby any high velocity particles entrained in a high pressure gas stream directed into the regulator must pass through the filter before passing in force-disrupted gas communication the energy absorbing device, and if not entrapped by the filter, can then impinge against a surface within the impingement region around the energy absorbing device before reaching the downstream end of the inlet body, and if not, the high velocity particles must pass sufficiently close to the energy absorbing device that it absorbs and thereby dissipates thermal energy associated with the high velocity particles, and if not, the high velocity particles are directed significantly out of its otherwise unobstructed path as to cause high velocity particles to sufficiently lose their thermal energy, such high velocity particles being thereby being introduced into the regulator without risk of fire or explosion.

* * * * *